United States Patent
Takano et al.

[11] Patent Number: 5,234,028
[45] Date of Patent: Aug. 10, 1993

[54] VARIABLE PRESSURE CONTROL VALVE

[75] Inventors: Toshiro Takano; Sadao Nunotani; Naoki Ishizaki, all of Kanagawa, Japan

[73] Assignee: Kabushiki Kaisho Komatsu Seisakusho, Japan

[21] Appl. No.: 761,341
[22] PCT Filed: Mar. 9, 1990
[86] PCT No.: PCT/JP90/00317
§ 371 Date: Sep. 6, 1991
§ 102(e) Date: Sep. 6, 1991
[87] PCT Pub. No.: WO90/10901
PCT Pub. Date: Sep. 20, 1990

[30] Foreign Application Priority Data

Mar. 10, 1989 [JP] Japan .............. 1-26620[U]

[51] Int. Cl.$^5$ .......................... F16K 17/06
[52] U.S. Cl. ............................. 137/529
[58] Field of Search ....................... 137/529

[56] References Cited

U.S. PATENT DOCUMENTS

| | | |
|---|---|---|
| 2,944,564 | 7/1960 | Pettey ................... 137/529 |
| 3,017,897 | 1/1962 | Seguenot . |
| 3,442,502 | 5/1969 | Fischer et al. . |
| 4,648,423 | 3/1987 | Henken ............. 137/529 X |

FOREIGN PATENT DOCUMENTS

| | | |
|---|---|---|
| 2034665 | 1/1972 | Fed. Rep. of Germany . |
| 3342901 | 6/1985 | Fed. Rep. of Germany . |
| 46-686 | 9/1971 | Japan . |
| 48-77720 | 9/1973 | Japan . |
| 59-46813 | 11/1984 | Japan . |
| 62-98409 | 5/1987 | Japan . |
| 62-89007 | 6/1987 | Japan . |
| 911392 | 11/1962 | United Kingdom . |

*Primary Examiner*—Robert G. Nilson
*Attorney, Agent, or Firm*—Ronald P. Kananen

[57] ABSTRACT

A variable pressure control valve arranged to enable a pilot piston having a comparatively small diameter to be used thereby making the whole body of the valve compact. This variable pressure control valve comprises a spool (2) kept in pressure contact with the valve seat of a pressurized fluid inlet port (1) by the resilient force of a compression spring (3); a stationary valve shoe (5) fixed so as to support the base end of the compression spring; and an auxiliary compression spring (6) which urges the spool (2) to the side of the valve seat on one side thereof and is urged by a pilot piston (4) on the other side thereof.

3 Claims, 1 Drawing Sheet

VARIABLE PRESSURE CONTROL VALVE

TECHNICAL FIELD OF THE INVENTION

This invention relates to a variable pressure control valve arranged to enable the pressure of hydraulic fluid flowing thereinto from a pressurized fluid inlet port to be variably set by introducing a pilot fluid pressure.

BACKGROUND ART OF THE INVENTION

As a variable pressure control valve, a valve constructed as shown, for example, in FIG. 1 is known.

Stated briefly, a variable pressure control valve is known wherein a spool 2 is kept in pressure contact with a valve seat of a pressurized fluid inlet port 1 by the resilient force of a compression spring 3, and a pilot fluid pressure Pp is introduced into a pilot piston 4 which supports the spring 3. The arrangement is made such that the force exerted on the spool 2 to keep it in pressure contact with the valve seat of the pressurized fluid inlet port 1 is increased or decreased by varying the pilot pressure Pp so that pressure of hydraulic fluid flowing thereinto from the pressurized fluid inlet port 1 can be variably set.

In such a variable pressure control valve, since the compression spring 3 is directly compressed by the pilot piston 4, it is necessary for the pilot piston 4 to have a large pressure receiving area. This results in a larger overall size of the valve, the valve cannot be made compact.

Stated more specifically, since in such a variable pressure control valve, the compression spring 3 having a high compression spring load is compressed directly by the pilot piston 4 and the pilot pressure Pp exerted on the pilot piston 4 is generally 30 kg/cm², the pressure receiving area of the pilot piston 4 needs to be increased in order to increase the urging force thereof. Thus, the diameter of the pilot piston 4 becomes larger, thus unavoidably making the overall size of the valve larger.

Stating concretely, if the diameter of the pressurized fluid inlet port 1 is designated by d, and the diameter of the pilot piston 4 by $D_1$, then the spring load $W_1$ set by the compression spring 3 is given by the following formula $$W_1 = \frac{\pi}{4} d^2 \times P$$

wherein P denotes the pressure within the pressurized fluid inlet port.

To increase the pressure P set in this condition by P, it is required to set the spring load $W_1$ at $\pi/4 d^2 (P + \Delta P)$.

Further, the urging or pushing force F given by the pilot piston 4 will be $\pi/4 D_1^2 \times Pp$.

Therefore, the diameter $D_1$ of the pilot piston 4 needs to be set at such a value which enables the valve to support the above-mentioned spring load $W_1$.

SUMMARY OF THE INVENTION

The present invention has been made in view of the above-mentioned circumstances in the prior art and has for its object to provide a variable pressure control valve constructed to enable a pilot piston having a comparatively small diameter to be used thereby making the whole body of the valve compact to solve the above-mentioned problem in the prior art.

To achieve the above-mentioned object, according to the present invention, there is provided a variable pressure control valve comprising: a spool kept into pressure contact with the valve seat of a pressurized fluid inlet port by the resilient force of a compression spring; a stationary spring shoe fixed so as to support the base end of the compression spring; and an auxiliary compression spring which urges the above-mentioned spool to the side of the valve seat on one side thereof and is urged by a pilot piston on the other side thereof.

According to the present invention having the above-mentioned aspect, since it is only necessary that the auxiliary compression spring is urged by a force which corresponds in magnitude to an increment in pressure to be set by the pilot piston, the urging force of the pilot piston can be reduced so that the pressure receiving area of the pilot piston can be reduced correspondingly.

Accordingly, the diameter of the pilot piston can be made comparatively small so that the whole body of the variable pressure control valve can be made compact.

The above-mentioned and other objects, aspects and advantages of the present invention will become apparent to those skilled in the art by making reference to the following detailed description and the accompanying drawing in which a preferred embodiment incorporating the principles of the present invention is shown by way of example only.

The present invention will now be described below by way of example only with reference to an embodiment shown in FIG. 2.

Figure 1:
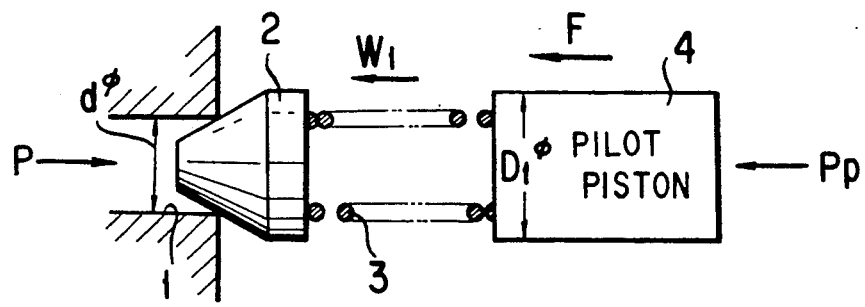
FIG. 1 shows a prior art variable pressure control valve.
Figure 2:
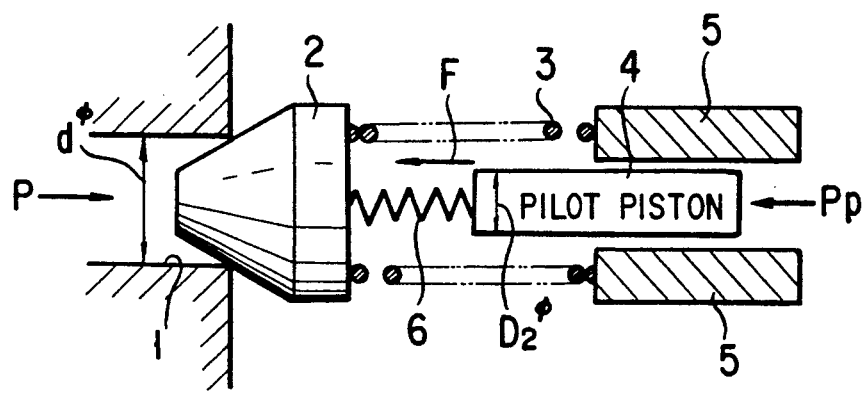

The variable pressure control valve according to the present invention is constructed such that, as shown in FIG. 2, a compression spring 3 is interposed between one end of a stationary or fixed spring shoe 5 and the base end of a spool 2, and an auxiliary compression spring 6 having a small compression spring load is interposed between the base end of the spool 2 and the leading end of a pilot piston 4 so that the auxiliary compression spring 6 can be compressed by the urging force of the pilot piston 4.

By such a construction, since the compression spring 3 having a high compression spring load is supported by the stationary spring shoe 5, and the auxiliary compression spring 6 having a low compression spring load is compressed by the urging force of the pilot piston 4 so that the pressure of hydraulic fluid flowing thereinto from a pressurized fluid inlet port 1 can be set at a high value, the urging force F provided by the pilot piston 4 can be reduced to thereby enable the pressure receiving area of the pilot piston 4. Hence, the diameter thereof is reduced.

Stated concretely, to increase the above-mentioned setting pressure by $\Delta P$, it is only necessary to set the compression spring load $W_2$ of the auxiliary compression spring 6 as follows.

$$W_2 = \frac{\pi}{4} d^2 \times \Delta P$$

Wherein the urging force F of the pilot piston 4 is equal to $\pi/4 D_2^2 \times Pp$.

Since the compression spring load $W_2$ is balanced with the urging force F, $$\frac{\pi}{4} D_2^2 \times P_p = \frac{\pi}{4} d^2 \times \Delta P$$

Thus, the relationship between the diameter $D_2$ of the pilot piston 4 and the diameter $D_1$ of the prior art pilot piston 4 will be $$\frac{D_1}{D_2} = \sqrt{\frac{P + \Delta P}{\Delta P}}$$

Therefore, the diameter of the pilot piston 4 can be reduced.

The foregoing description is merely an example of preferred embodiments of the present invention, and the scope of the present invention is not limited to this example. Many changes and modifications of the present invention will readily occur to those skilled in the art without departing from the scope of the present invention.

What is claimed is:

1. A variable pressure control valve comprising:
   a spool kept in a pressure contact with a valve seat of a pressurized fluid inlet port by the resilient force of a compression spring which provides a first spring force urging said spool to a closed position against a pressure of a fluid at said pressurized fluid inlet port:
   a stationary spring shoe fixed so as to support a base end of said compression spring; and
   an auxiliary compression spring which urges said spool to the side of said valve seat on one side thereof with a force which is variable depending upon a position of a pilot piston having a smaller diameter than said stationary spring shoe and movable in response to a pilot pressure exerted on the end remote from said auxiliary compression spring, said auxiliary compression spring exerting a second spring force variable depending upon the position of said pilot piston for determining a set force for said spool in cooperation with said first spring force.

2. A variable pressure control valve for openably closing a pressurized fluid inlet port in a hydraulic passage system and for variably setting the force to close the port, comprising:
   a valve spool disposed for movement relative to said pressurized fluid inlet port for selectively opening and closing said inlet port depending upon the pressure of a fluid at said inlet port;
   a first coil spring seated on said valve spool at one end and on a stationary spring seat member at the other end for exerting a constant primary spring force to said valve spool for providing a first set force for said valve spool, said stationary spring seat member being formed into a cylindrical configuration defining a bore;
   a pilot piston disposed in said bore of said stationary spring seat member for axial movement toward any away from said valve spool and responsive to a pilot pressure exerted on a first end remote from said valve spool for axial movement relative to said valve spool, said pilot piston having a second end opposite to said first end; and
   a second coil spring coaxially arranged with said first coil spring and seated on said valve spool at one end and on said second end of said pilot piston for exerting an auxiliary spring force variable depending upon the axial position of said pilot piston for providing a second set force for said valve spool, said second set force being cooperative with said first set force for determining the set force on said valve spool.

3. A variable pressure control valve for openably closing a pressurized fluid inlet port in a hydraulic passage system, comprising:
   a valve spool disposed for movement relative to said pressurized film inlet port for selectively opening and closing said inlet port depending upon the pressure of a fluid at said inlet port;
   a first mechanical spring means seated on said valve spool at one end and on a stationary spring seat member at the other end for exerting a primary spring force to said valve spool for providing a first set force for said valve spool;
   a pilot piston disposed for axial movement toward and way from said valve spool and responsive to a pilot pressure exerted on a first end remote from said valve spool for axial movement relative to said valve spool, said pilot piston having a second end opposite to said first end;
   a second mechanical spring means seated on said valve spool at one end on said second end of said pilot piston for exerting an auxiliary spring force variable depending upon the axial position of said pilot piston for providing a second set force for said valve spool, said second set force being cooperative with said first set force for determining the set force on said valve spool; and
   said stationary spring seat member being formed into a cylindrical configuration defining a bore slidably receiving said pilot piston.

* * * * *